No. 672,858. Patented Apr. 23, 1901.
W. H. McFADDEN.
CAISSON.
(Application filed Oct. 5, 1900.)
(No Model.) 4 Sheets—Sheet 1.
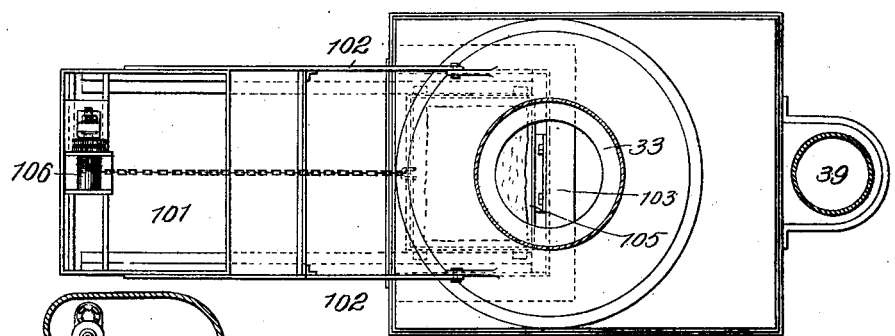
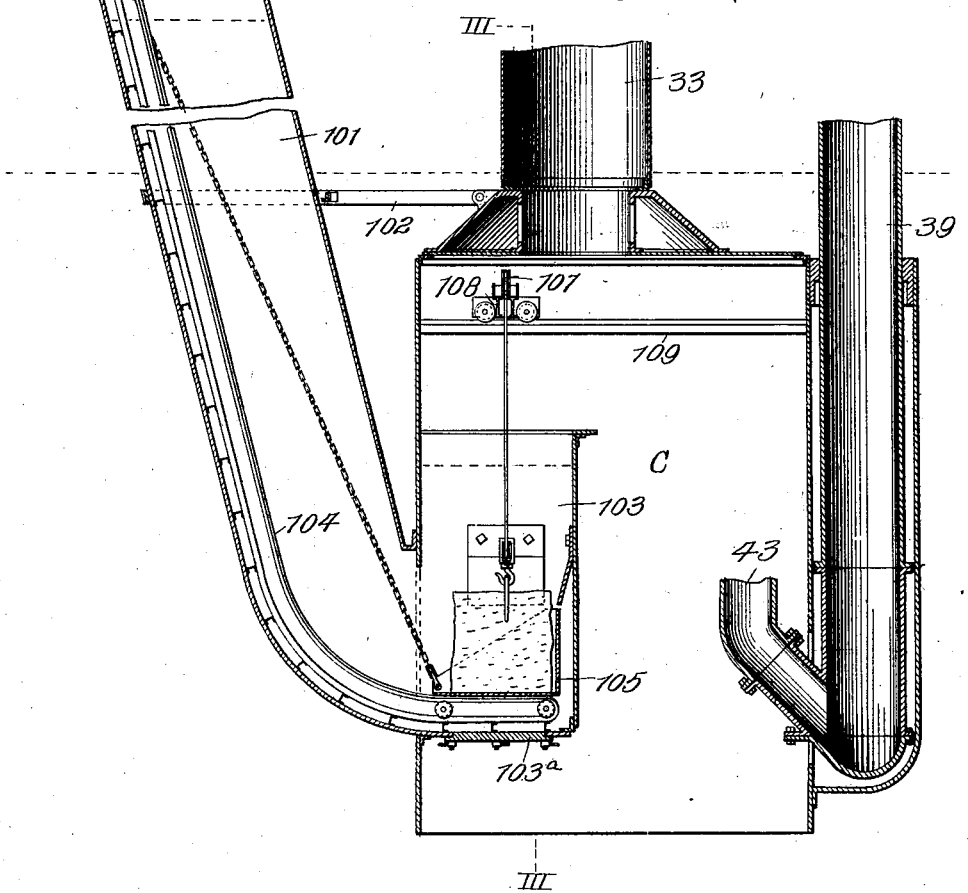
WITNESSES:
INVENTOR
William H. McFadden
by Darwin L. Wolcott Att'y.

No. 672,858. Patented Apr. 23, 1901.
W. H. McFADDEN.
CAISSON.
(Application filed Oct. 5, 1900.)
(No Model.) 4 Sheets—Sheet 2.

WITNESSES:
Herbert Bradley
F. E. Gaither

INVENTOR
William H. McFadden
by Darwin S. Wolcott Att'y.

No. 672,858. Patented Apr. 23, 1901.
W. H. McFADDEN.
CAISSON.
(Application filed Oct. 5, 1900.)
(No Model.) 4 Sheets—Sheet 3.
FIG.6. FIG.8.
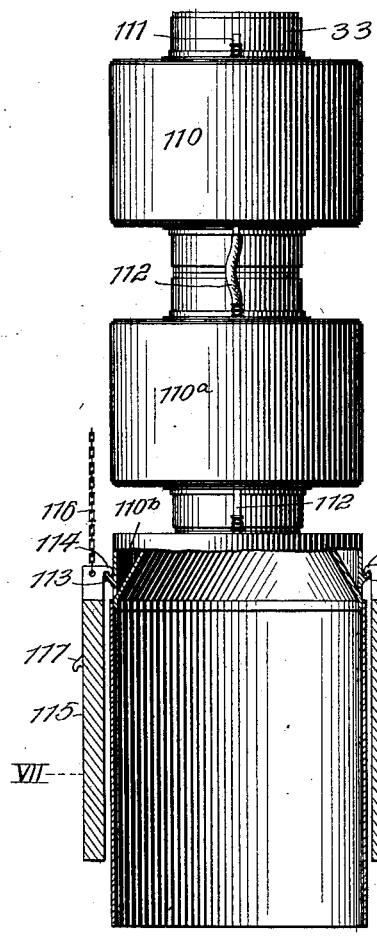
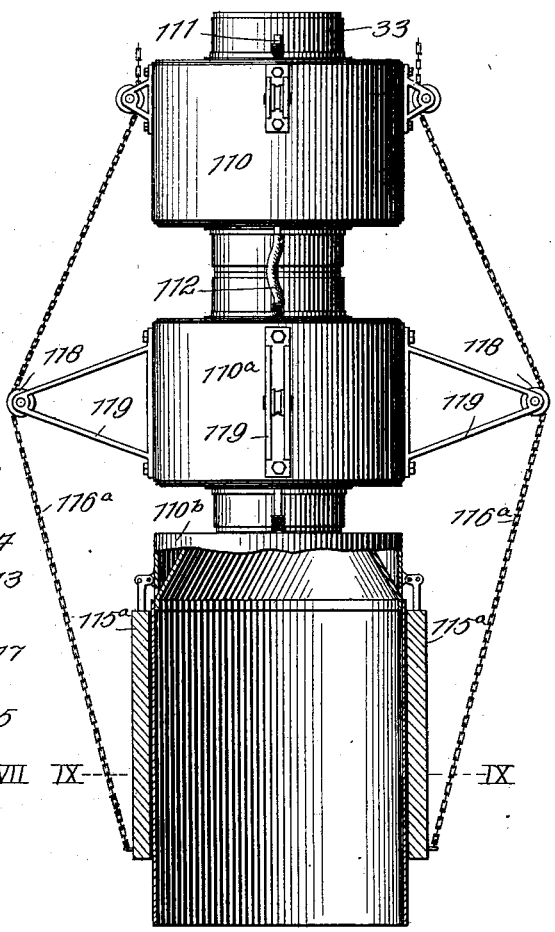
FIG.7. FIG.9.
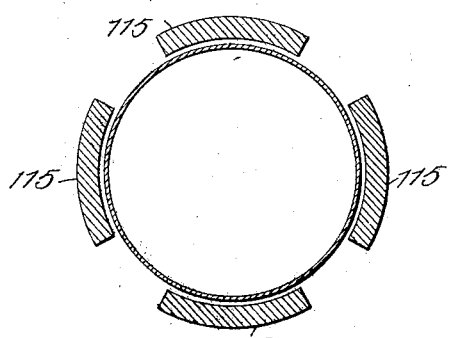
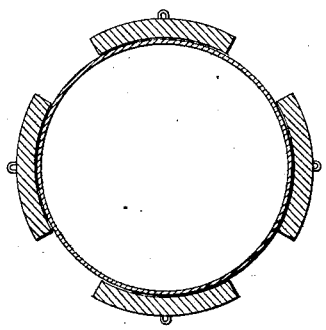
WITNESSES: INVENTOR
William H. McFadden
by Dennis S. Wolcott Att'y.

No. 672,858.  
W. H. McFADDEN.  
CAISSON.  
(Application filed Oct. 5, 1900.)  
Patented Apr. 23, 1901.

(No Model.)  
4 Sheets—Sheet 4.

WITNESSES:

INVENTOR

UNITED STATES PATENT OFFICE.

WILLIAM H. McFADDEN, OF PITTSBURG, PENNSYLVANIA, ASSIGNOR TO CONSOLIDATED MINING AND DREDGING COMPANY, OF SAME PLACE.

CAISSON.

SPECIFICATION forming part of Letters Patent No. 672,858, dated April 23, 1901.

Application filed October 5, 1900. Serial No. 32,152. (No model.)

*To all whom it may concern:*

Be it known that I, WILLIAM H. MCFADDEN, a citizen of the United States, residing at Pittsburg, in the county of Allegheny and State of Pennsylvania, have invented or discovered certain new and useful Improvements in Caissons, of which improvements the following is a specification.

The invention described herein relates to certain improvements in the form or construction of caissons described and shown in Letters Patent No. 656,850, granted to me August 28, 1900; and the invention has for its object a construction whereby material may be fed into the caisson as well as removed therefrom and also whereby the caisson may be rendered more stable when submerged.

The invention is hereinafter more fully described and claimed.

Figure 3:
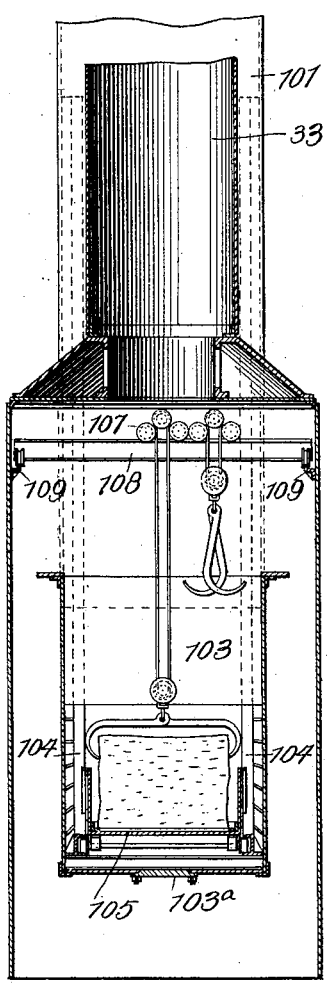
Figure 5:
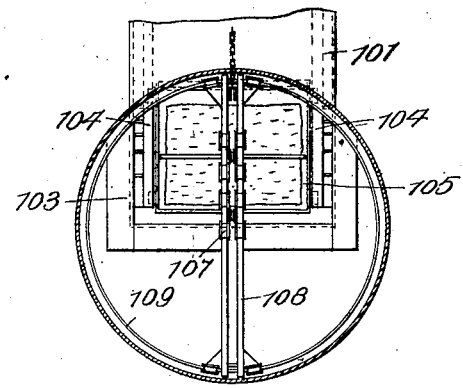
Figure 4:
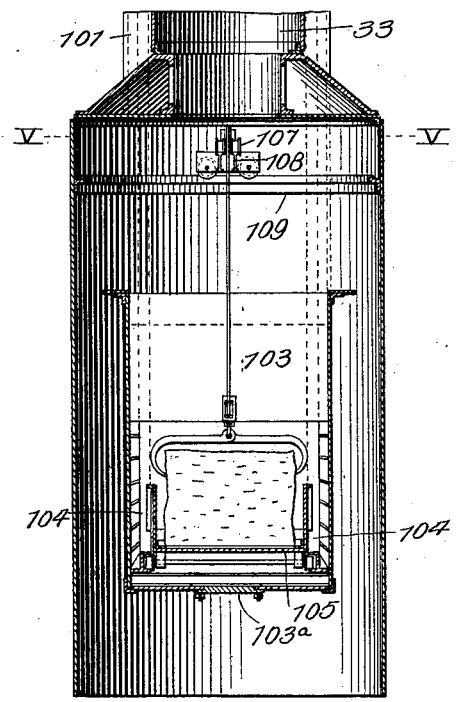
Figure 10:
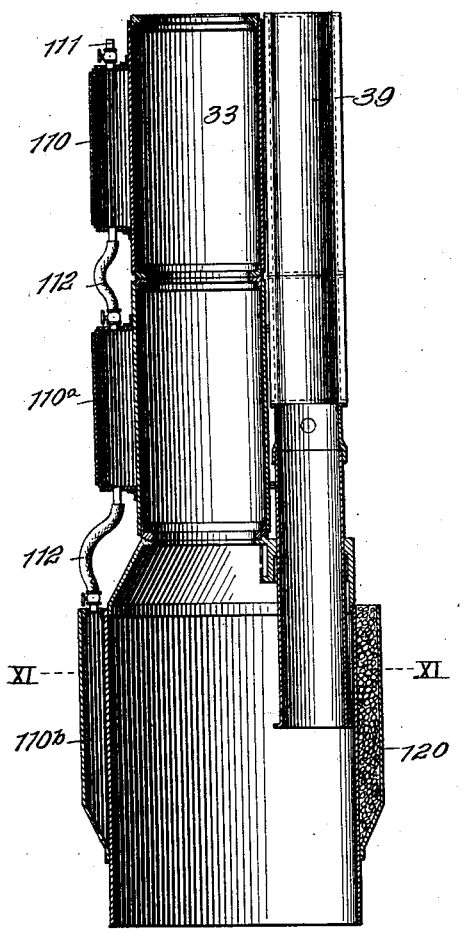
Figure 12:
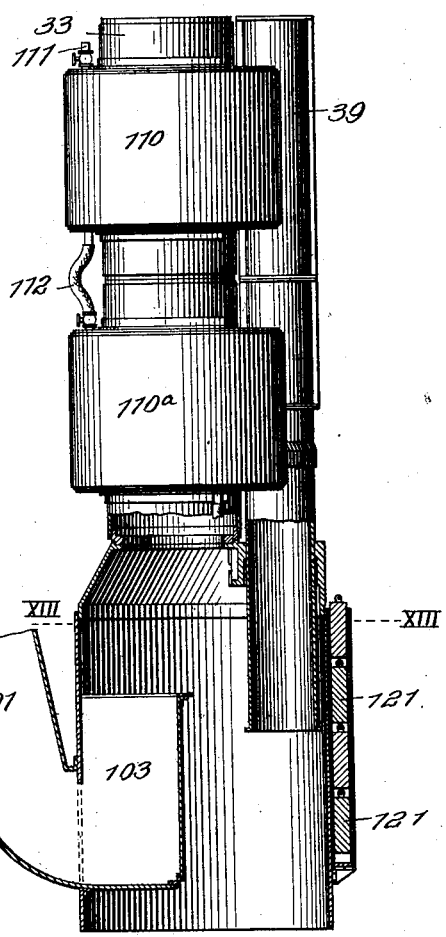
Figure 11:
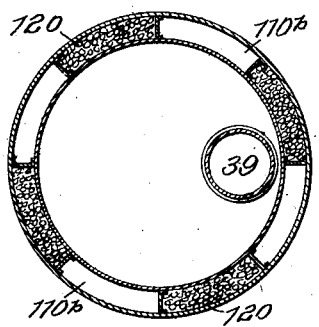
Figure 14:
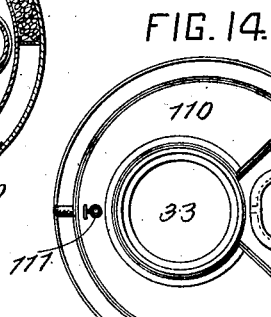
Figure 13:
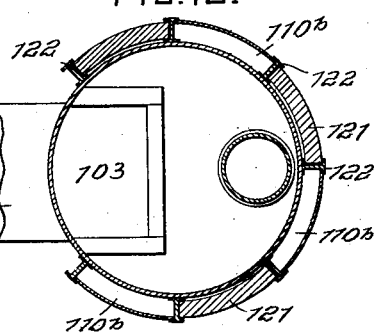

In the accompanying drawings, forming a part of this specification, Figure 1 is a sectional elevation of the lower portion of the caisson having my improved charging and discharging mechanism applied thereto. Fig. 2 is a top plan view of the same. Fig. 3 is a sectional view on a reduced scale, the plane of section being indicated by the line III III, Fig. 1. Fig. 4 is a view similar to Fig. 3, illustrating a modification of the apparatus. Fig. 5 is a sectional plan view on a plane indicated by the line V V, Fig. 4. Fig. 6 is a view, partly in section and partly in elevation, of the lower portion of the caisson, illustrating my improvements as regards the means for submerging and raising the caisson. Fig. 7 is a sectional plan view on a plane indicated by the line VII VII, Fig. 6. Fig. 8 is a view similar to Fig. 6, illustrating a modification of the manner of weighting the caisson. Fig. 9 is a sectional plan view on a plane indicated by the line IX IX, Fig. 8. Fig. 10 is a sectional elevation of the lower portion of the caisson, illustrating a further modification of the submerging and buoying mechanism. Fig. 11 is a sectional plan view on a plane indicated by the line XI XI, Fig. 10. Fig. 12 is a view, partly in section and partly in elevation, illustrating a further modification in the weighting and buoying mechanism. Fig. 13 is a sectional plan view on a plane indicated by the line XIII XIII, Fig. 12; and Fig. 14 is a top plan view of the construction shown in Fig. 10.

In the practice of my invention the caisson is constructed, as described in the patent referred to, with a tunnel portion 33, connecting the air-chamber at the top (not shown) and the working chamber C, which is constructed with an open lower end. In addition to and in some cases in lieu of the discharge-conduit 39 and its U-shaped vertical extension within the working chamber I provide a conduit 101, which is made of a length outside of the working chamber sufficient to extend above the level of the water in which the caisson is to be submerged and is preferably braced to the caisson by a brace or rod 102. This conduit is connected to the walls of the working chamber, through which an opening is formed into the conduit, and on the inside of the working chamber is formed a receiving-box 103, having an open upper end and a closed lower end, as clearly shown in Fig. 1. It is preferred to arrange within the conduit tracks 104, which extend down along the one side of the conduit and into the bottom of the receiving-box 103. On this track or rail are mounted the wheels of a truck 105, which can be drawn up through the conduit by a windlass 106 or other suitable means, arranged at or adjacent to the top of the conduit. The truck is so constructed as to retain upon it any material which it may be desired to draw up from the working chamber of the caisson or to lower into it. In order to facilitate the placing of the material on the truck in the receiving-box or to remove it therefrom into the working chamber, a trolley 107, of any suitable construction, is mounted upon rails 108, which extend diametrically across the caisson and are provided at their ends with wheels supported upon rails 109, arranged when the caisson is rectangular, or approximately so, in cross-section along the sides of the latter or entirely around the working chamber when the latter is circular, or approximately so, in cross-section. The trolley is provided, as is usual, with suitable hoisting mechanisms, so that the material—such as rock, &c.—can be grappled and raised from the bottom of the working chamber and transferred laterally and lowered into the receiving-chamber 103, or by reverse movements material can be removed from the receiving chamber or box into the working chamber.

The bottom or one side or a portion of the bottom or side of the receiving box or chamber is made removable, as at 103ª, for the purpose of removing dirt, &c., from the conduit. As in the case of the conduit 39, a water seal is maintained in the conduit 101, the air-pressure in the caisson being retained and balanced by a water column in the conduit. In order to prevent escape of air from the caisson when the portion 103ª is removed, a removable cap 101ª is secured hermetically, or practically so, over the upper end of the conduit 101.

In the patent referred to the submerging of the caisson and holding it in such position are effected by means of a water-tank arranged above the air-chamber. The placing of the submerging-weight on top of the caisson is liable to render the same unstable when deeply submerged. In order to render the caisson stable, one or more chambers for the reception of submerging-weights are formed around the lower end of the tunnel 33 or on the sides of the working chamber itself, or both constructions may be employed. These chambers 110, 110ª, and 110ᵇ have their lower ends open, so that water may flow thereinto when the caisson is submerged, displacing the air through the pipe 111, extending up above the surface of the water. When it is desired to raise the caisson, air is forced through the pipe 111 into the chambers 110, thereby displacing the water contained therein through the opening in the bottom of the chamber or the lower one of the series of chambers, which when two or more series are used are connected together by pipes 112.

In addition to or in lieu of the chambers 110 solid weights may be attached to the working chamber, as shown in Figs. 6, 8, 10, and 12. As shown in Fig. 6, hooks 113 may be formed on or secured to the sides of the working chamber, so arranged as to engage corresponding hooks 114 on blocks of metal 115. When it is desired to submerge the caisson, these weights are attached to the latter and will assist in carrying down the caisson. When the caisson is to be raised, the weights are lifted by means of chains 116, connected to their upper ends. As these weights extend down a considerable distance along the working chamber and as it may be desirable at times to submerge a greater portion or all of the working chamber, the weights are provided with auxiliary hooks 117, so that the weights may be supported by the caisson at different heights and will not come into contact with the earth, &c., whereby they would be rendered more or less inoperative for sinking the caisson. As shown in Fig. 6, the weights 115ª may be pivotally connected to the working chamber. When it is desired to further submerge the caisson, the weights may be swung out by the chains 116ª, which pass over guide-pulleys 118, held away from the caisson by brackets 119, as shown in Fig. 8.

As shown in Figs. 10 to 13, inclusive, the weighting of the caisson may be effected by forming pockets 120 around the sides of the working chamber, said pockets alternating with the chambers 110ᵇ when the latter are employed. These pockets are formed with open upper ends and can be filled by stone or other heavy material when it is desired to submerge the caisson. It is preferred to employ metal blocks 121 with eyes or other suitable means whereby they can be lifted from the pockets 120 when it is desired to raise the caisson. When using the regular metal blocks 121, as shown in Figs. 12 and 13, mere guiding and retaining ribs 122 may be formed on the sides of the caisson, as shown in Fig. 13.

It will be understood that either one of the conduits, or both, may be used. When both are used, the large material, as rocks, &c., would be removed through the conduit 101.

I claim herein as my invention—

1. A caisson having in combination a working chamber having an open lower end, a water-sealed conduit extending from the working chamber to a point above the level of the water, mechanism for raising and lowering material arranged within the conduit, and a movable raising and lowering mechanism arranged within the working chamber, substantially as set forth.

2. A caisson having in combination a working chamber having an open lower end, a water-sealed conduit extending from the working chamber to a point above the level of the water, a receiving-box for the conduit, provided with an open upper end within the working chamber and having a removable side or bottom portion, and means for closing the conduit to prevent the escape of air when the water seal is broken, substantially as set forth.

3. A caisson having in combination a working chamber, a tunnel extending from the working chamber, submerging-weights connected to the working chamber and means extending above the water-level for changing the positions of said weights relative to the lower edge of the working chamber, substantially as set forth.

4. The combination of a caisson, submerging-weights, detachably connected to the caisson below the level of the water, and means above the level of the water for disconnecting the weights from the caisson, substantially as set forth.

In testimony whereof I have hereunto set my hand.

WILLIAM H. McFADDEN.

Witnesses:
DARWIN S. WOLCOTT,
F. E. GAITHER.